: 2,721,191
Patented Oct. 18, 1955

2,721,191

COPPER COMPLEX COMPOUNDS OF TRISAZO DYESTUFFS

Fritz Suckfüll, Leverkusen-Wiesdorf, and Paul Zervas, Koln-Dellbruck, Germany, assignors to Farbenfabriken Bayer Aktiengesellschaft, Leverkusen, Germany, a corporation of Germany No Drawing. Application April 9, 1952,
Serial No. 281,462

Claims priority, application Germany April 26, 1951

4 Claims. (Cl. 260—145)

The present invention relates to new copper complex compounds of trisazo dyestuffs and to a method of making the same; more particularly it relates to the copper complex compounds of trisazo dyestuffs of the following general formula:

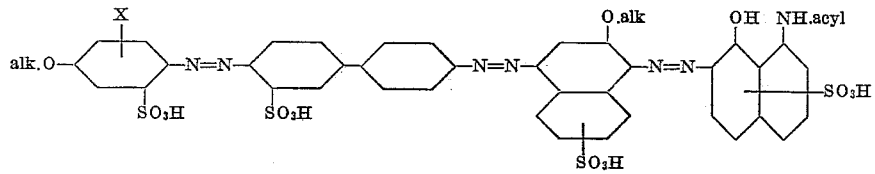

In this formula X stands for hydrogen of methyl, alk stands for methyl or ethyl, and acyl stands for the radical of a monocarboxylic acid.

The new trisazo dyestuffs and their copper complex compounds are obtainable by coupling the diazotized monoazo dyestuffs of the formula:

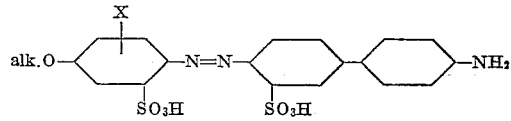

with a 1-amino-2-alkoxynaphthalene-sulfonic acid, diazotizing the aminodisazo dyestuff thus obtained, coupling it with a 1-acylamino-8-hydroxy-naphthalene-sulfonic acid, and finally treating the trisazo dyestuff thus prepared with copper-yielding agents. The aminomonoazo dyestuffs used as starting materials are obtained by coupling diazotized 4-amino-4'-acetylamino-diphenyl-3-sulfonic acid with 1-hydroxybenzene- or 1-hydroxy-6-methyl-benzene-3-sulfonic acid, alkylation and saponification.

The new copper-containing trisazo dyestuffs dye cotton and fibres of regenerated cellulose essentially olive-green shades of good fastness to light.

The new dyestuffs excel known comparative dyestuffs containing the radical of 4,4'-diaminostilbene-2,2'-disulfonic acid instead of the radical of benzidine-monosulfonic acid in a markedly improved fastness to light.

The following examples illustrate the present invention without, however, limiting it thereto, the parts being by weight:

*Example 1*

52.1 parts of the di-sodium salt of the aminoazo dyestuff of the following formula:

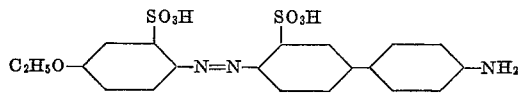

are dissolved in 700 parts of warm water and, after adding a solution of 8 parts of sodium nitrite, indirectly diazotized with 50 parts of hydrochloric acid (19° Bé.) for 3 hours at 3 to 5° C. The isolated diazo compound, after adding 300 parts of ice-water, is added to a solution of 28.9 parts of the sodium salt of 1-amino-2-ethoxynaphthalene-6-sulfonic acid at 10 to 15° C. After about 12 hours the coupling is completed, whereupon the aminodisazo compound is dissolved with 13.3 parts of caustic soda solution (specific gravity 1.33) and indirectly diazotized with a solution of 8 parts of sodium nitrite and 135 parts of hydrochloric acid (19° Bé.) for 3 hours at 28 to 30° C. The diazodisazo compound is combined with 28.1 parts of 1-acetylamino-8-hydroxynaphthalene-4-sulfonic acid in the presence of 45 parts of sodium bicarbonate and 300 parts of pyridine at 0° C. After the coupling is completed, the trisazo dyestuff obtained is salted out at 60° C., isolated and redissolved. The dyestuff paste obtained is dissolved in 4000 parts of water and converted into the complex copper compound by 2 hours' heating with 24 parts of crystallized copper sulfate in the presence of 10 parts of 50% acetic acid and 15 parts of crystallized sodium acetate to 98 to 100° C., the copper complex being separated by salting out of the weakly alkaline solution. It is the copper complex compound of the trisazo dyestuff corresponding as free acid to the formula:

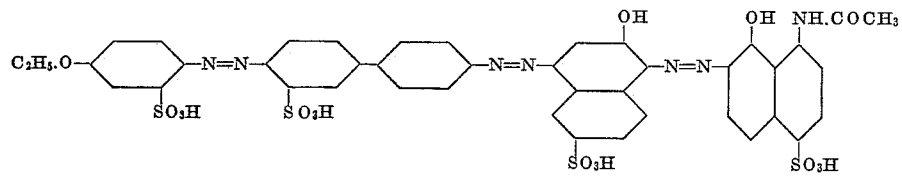

and dyes cotton fast clear olive-green shades.

*Example 2*

52.1 parts of the di-sodium salt of the aminoazo dyestuff of the formula:

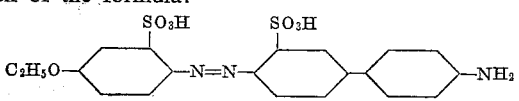

are diazotized according to Example 1. The diazoazo compound is coupled with 1-amino-2-ethoxynaphthalene-6-sulfonic acid, the aminodisazo compound is further diazotized, and the diazodisazo compound is coupled with 29.5 parts of 1-propionylamino-8-hydroxynaphthalene-4-sulfonic acid and converted into the complex copper compound. The copper-containing trisazo dyestuff obtained dyes cotton clear olive-green shades. It is the copper complex of the dyestuff corresponding as free acid to the formula:

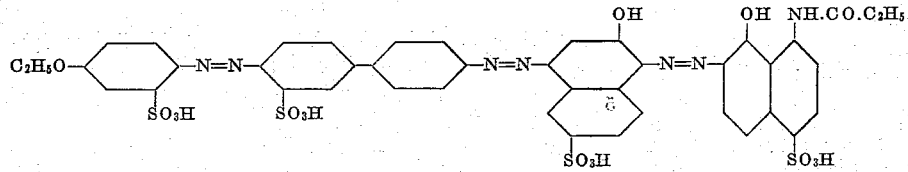

When the 1-propionylamino-8-hydroxynaphthalene-4-sulfonic acid is replaced by equimolecular quantities of 1-benzoylamino-8-hydroxynaphthalene-4-sulfonic acid, a similar dyestuff is obtained.

*Example 3*

53.5 parts of the di-sodium salt of the aminoazo dyestuff of the formula:

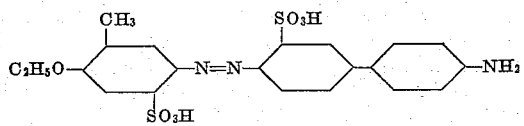

are indirectly diazotized, coupled with 26.7 parts of 1-amino-2-ethoxynaphthalene-6-sulfonic acid, further diazotized, and the diazodisazo compound thus obtained is coupled with 28.1 parts of 1-acetylamino-8-hydroxy-naphthalene-4-sulfonic acid. The trisazo dyestuff, converted into the complex copper compound, dyes cotton olive-green clear shades. The new dyestuff is the copper complex compound of the trisazo dyestuff corresponding as free acid to the formula:

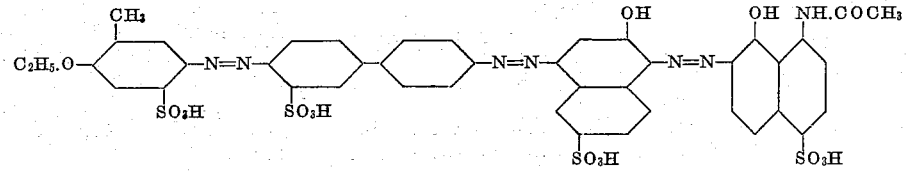

We claim:
1. Copper complex compounds of trisazo dyestuffs corresponding as free acids to the general formula:

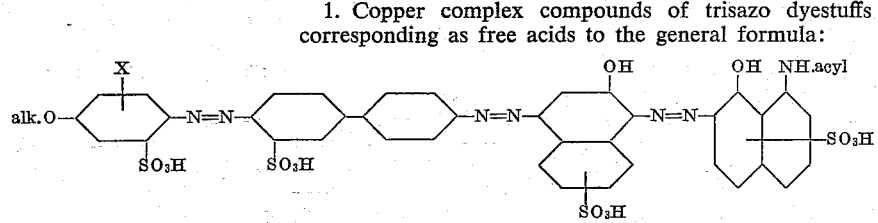

wherein X stands for one of the group consisting of hydrogen and methyl, alk stands for one of the group consisting of methyl and ethyl, and acyl stands for the radical of a monocarboxylic acid.

2. The copper complex compound of the trisazo dyestuff corresponding as free acid to the formula:

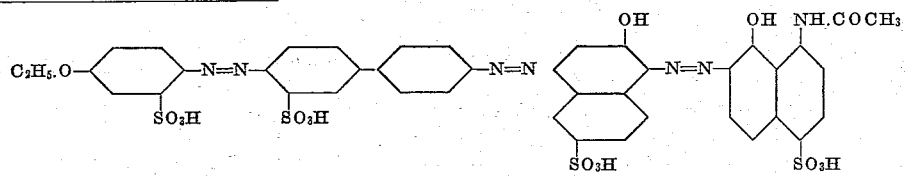

3. The copper complex compound of the trisazo dyestuff corresponding as free acid to the formula:

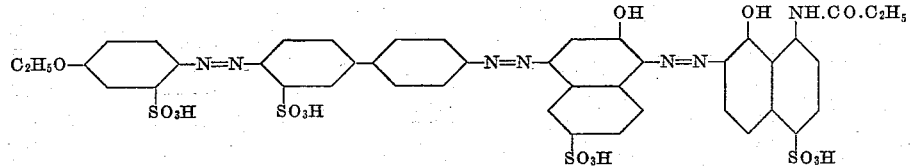

4. The copper complex compound of the trisazo dyestuff corresponding as free acid to the formula:

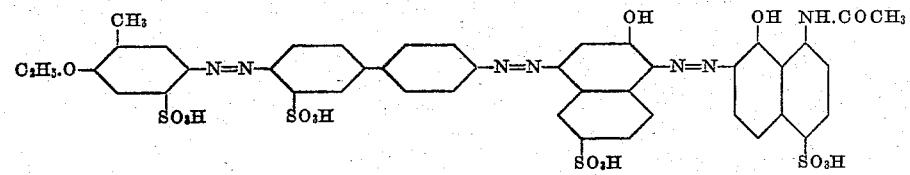

References Cited in the file of this patent

UNITED STATES PATENTS

| | | |
|---|---|---|
| 1,927,103 | Taube et al. | Sept. 19, 1933 |
| 2,216,258 | Weinand et al. | Oct. 1, 1940 |
| 2,282,331 | Krebser et al. | May 12, 1942 |